US008464328B2

(12) United States Patent
Giraud et al.

(10) Patent No.: US 8,464,328 B2
(45) Date of Patent: Jun. 11, 2013

(54) METHOD FOR PROTECTING PERSONAL DATA READ IN A TERMINAL STATION BY A SERVER

(75) Inventors: Jean-Luc Giraud, Jardin des Potiers (FR); Pierre Girard, La Ciotat (FR)

(73) Assignee: GEMALTO SA, Meudon (FR)

( * ) Notice: Subject to any disclaimer, the term of this patent is extended or adjusted under 35 U.S.C. 154(b) by 882 days.

(21) Appl. No.: 10/484,524

(22) PCT Filed: Jul. 22, 2002

(86) PCT No.: PCT/FR02/02614
§ 371 (c)(1),
(2), (4) Date: Sep. 20, 2004

(87) PCT Pub. No.: WO03/010639
PCT Pub. Date: Feb. 6, 2003

(65) Prior Publication Data
US 2005/0050437 A1 Mar. 3, 2005

(30) Foreign Application Priority Data
Jul. 25, 2001 (FR) ..................................... 01 09969

(51) Int. Cl.
*H04L 29/06* (2006.01)
(52) U.S. Cl.
USPC ............. 726/10; 713/165; 713/166; 713/167; 713/180
(58) Field of Classification Search
USPC ....................................................... 713/165
See application file for complete search history.

(56) References Cited

U.S. PATENT DOCUMENTS

| 5,544,322 | A | * | 8/1996 | Cheng et al. ................... 709/229 |
| 6,026,166 | A | * | 2/2000 | LeBourgeois ................. 713/156 |
| 6,073,242 | A | * | 6/2000 | Hardy et al. ....................... 726/1 |
| 6,105,027 | A | * | 8/2000 | Schneider et al. ............. 709/229 |
| 6,178,505 | B1 | * | 1/2001 | Schneider et al. ............. 713/168 |
| 6,192,380 | B1 | | 2/2001 | Garney et al. |
| 6,216,231 | B1 | * | 4/2001 | Stubblebine .................... 726/10 |

(Continued)

FOREIGN PATENT DOCUMENTS
WO      01 50400      7/2001

OTHER PUBLICATIONS

Kortuem, Gerd; Schneider, Jay; Preuitt, Dustin. When Peer-to-Peer comes Face-to-Face: Collaborative Peer-to-Peer Computing in Mobile Ad hoc Networks. First International Conference on Peer-to-Peer Computing. Pub. Date: 2001. Relevant pp. 75-91. Found on the World Wide Web at: http://ieeexplore.ieee.org/stamp/stamp.jsp?tp=&arnumber=990429.*

(Continued)

*Primary Examiner* — Nathan Flynn
*Assistant Examiner* — Jeremiah Avery
(74) *Attorney, Agent, or Firm* — Buchanan Ingersoll & Rooney PC

(57) ABSTRACT

The invention concerns a method enabling a server manager to prove subsequently that the server was authorized to read a user's personal data in a terminal station (ST), comprising: transmitting server policy data (PS) to the station; comparing the server policy data with private policy data (PP) pre-stored in the station; determining a signature (SGST) of server policy data received in the station; and transmitting the signature with the personal data (DP) read in the station to the server when the compared policy data (PS, PP) are compatible.

13 Claims, 2 Drawing Sheets

U.S. PATENT DOCUMENTS

| | | | |
|---|---|---|---|
| 6,339,827 B1 * | 1/2002 | Stokes et al. | 713/176 |
| 6,408,336 B1 * | 6/2002 | Schneider et al. | 709/229 |
| 6,442,696 B1 * | 8/2002 | Wray et al. | 726/5 |
| 6,467,040 B1 * | 10/2002 | Apte et al. | 713/168 |
| 6,487,660 B1 * | 11/2002 | Vanstone et al. | 713/168 |
| 6,519,627 B1 * | 2/2003 | Dan et al. | 709/203 |
| 6,751,657 B1 * | 6/2004 | Zothner | 709/220 |
| 6,751,731 B1 * | 6/2004 | Binding et al. | 713/171 |
| 6,785,728 B1 * | 8/2004 | Schneider et al. | 709/229 |
| 6,799,177 B1 * | 9/2004 | Fai et al. | 707/9 |
| 6,941,355 B1 * | 9/2005 | Donaghey et al. | 709/220 |
| 6,978,376 B2 * | 12/2005 | Giroux et al. | 713/189 |
| 7,073,055 B1 * | 7/2006 | Freed et al. | 713/155 |

OTHER PUBLICATIONS

Muftic S. et al.; Security Architecture for Distributed Systems; Computer Communications, Jul. 1, 1994; pp. 492-500; vol. 17, No. 7; Elsevier Science Publishers BV, Amsterdam, NL.

* cited by examiner

METHOD FOR PROTECTING PERSONAL DATA READ IN A TERMINAL STATION BY A SERVER

BACKGROUND OF THE INVENTION

The present invention relates in general to automated processing of personal data, and more particularly to protecting personal data read from a user terminal station by a server, in particular an Internet site server.

In order to satisfy increasingly insistent demands from consumers to protect their personal data, in particular their identity and address details, in relations between their terminal stations and servers, private policies generated by users are being provided in terminal stations.

After a call has been set up between a server and such a terminal station, the server communicates server policy data indicating in particular to the terminal station the various uses of the personal data of the user of the terminal station that the manager of the server wishes to take from the terminal station, in particular with a view to disseminating such personal data to other sites or economic players. In order to filter or screen such uses, the terminal station compares the received server policy data with the private policy data pre-stored in the terminal station so as to transmit personal data requested by the server only when the policies are compatible.

However, the policy of the server is merely a declaration and the server manager is not able subsequently, during an audit or when the user exercises their right of opposition, to justify that the user did indeed authorize the server manager to disseminate certain data.

SUMMARY OF THE INVENTION

An object of the invention is to remedy that drawback so that the server manager can prove subsequently any authorization to read personal data from the terminal station, and thus any consent by the user of the terminal station to communicate predetermined personal data.

To this end, a method of protecting personal data read from a user terminal station by a server, said method including transmitting server policy data from the server to the station, and comparing the server policy data with private policy data pre-stored in the station, is characterized by determining a signature for signing the server policy data received in the station and by transmitting the signature with personal data read from the station to the server from the station when the server policy data is compatible with the private policy data.

By means of the signature transmitted to the server, which signature is stored by said server, the manager of the server is capable of certifying, through the private policy pre-stored in the terminal station, that the user has indeed authorized reading of personal data predetermined as a function of the server policy.

In addition, if a plurality of policies are proposed or have been negotiated, or if the server policy has been modified subsequently, the manager of the server is capable of proving that said policies have been accepted by the user during successive sessions.

In order to avoid opposability by the user of the terminal station relative to the security policy data, the method may further include transmitting a signature of the server policy data with the server policy data from the server to the terminal station, and storing said signature in the terminal station, preferably with time-stamping data transmitted by the server. This second signature then serves as proof that the user did indeed receive a determined server policy at a given instant.

In order to provide portability for the private policy data and particularly personal data which is mainly nominative, the terminal station includes a central processing unit and a smart card in association with the central processing unit and that has pre-stored said private policy data and the personal data. Preferably, the smart card contains an algorithm for signing the received server policy data.

BRIEF DESCRIPTION OF THE DRAWINGS

Other characteristics and advantages of the present invention will appear more clearly on reading the following description of preferred implementations of the invention with reference to the corresponding accompanying drawings, in which.

DETAILED DESCRIPTION

Figure 1:
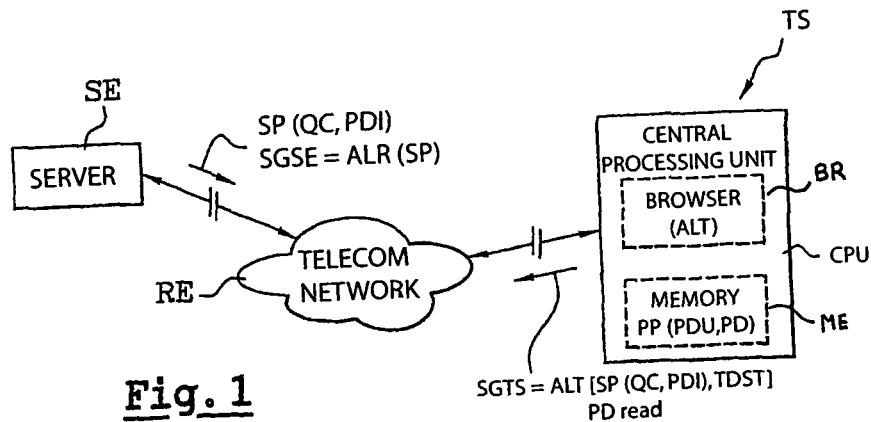
FIG. 1 is a block diagram of a telecommunications system having a server and a terminal station for implementing the method of the invention for protecting personal data.

FIG. 1 diagrammatically shows a server SE constituting a Web site and a user terminal station TS interconnected in particular via a packet telecommunications network NE including the Internet.

In a first implementation, the terminal station TS is a personal computer PC which is represented diagrammatically in FIG. 1 by its central processing unit CPU, peripherals thereof, such as keyboard, screen, printer, modem, etc. not being shown.

In a variant, the terminal station TS is based on a platform that can include a personal data assistant (PDA) and/or a mobile radiotelephone terminal; in the latter variant, the network NE encompasses the cellular radiotelephone network on which the mobile terminal is parented.

As shown diagrammatically in FIG. 1, the central processing unit CPU of the terminal station TS includes, in particular in connection with the invention, a memory ME, such as a hard disk, that contains pre-stored data PP defining a private policy and personal data PD, and a browser BR acting as a customer relative to the Web server SE, and managing the graphics interface with the user of the terminal station and links for accessing documents, in particular forms, transmitted by the server.

The personal data PD of the user of the station TS is, in particular, nominative and it can include at least one of the following items of data: the identity of the user composed by their surname, at least one of their forenames, and optionally their date of birth; the location of the terminal station that can be determined automatically, in particular when the terminal station is a mobile radiotelephone terminal; an electronic mail (email) address; the home address and/or the work address of the user; a telephone number; a list of the most recently visited Web sites, etc. Each of the items of personal data PD stored in the central processing unit CPU is designated by a personal data identifier PDI so that the personal data items can be read under control from the server SE, as explained below.

The private policy data PP defines management of the personal data DP of the user of the terminal station TS with respect to their relations with the outside of the central processing unit, and particularly with any Web server SE. In particular, the private policy data PP comprises one or more personal data uses PDUs for each item of personal data PD as desired by the user. Conversely, an item of personal data use data PDU can also be associated with a plurality of items of personal data PD. The data items PD and PDU preferably comply with the standard Platform for Privacy Preferences Project (P3P) format, as do the server policy SP data items that are produced by the server SE and transmitted to the browser BR in the station TS. All of the documents and data items in P3P format are written in Extended Markup Language (XML) or, in a variant, in Wireless Markup Language (WML) which adapts XML to the Wireless Access Protocol (WAP) display standard when the terminal station is a mobile radiotelephone terminal.

The PDU data items represent private rules established by the user of the terminal station so as to authorize certain items of personal data PD to be read from the memory ME by the server SE. The private rules are programmed by the user in the browser BR and can depend in particular on:

the subsequent use by the manager of the server SE of the personal data PD communicated by the terminal station TS to the server SE, e.g. for automated processing for the purposes of direct marketing, statistics, resale, etc.;

the location of the terminal station which can at the home or at the office of the user, or which can be taking part in a telephone conference; e.g. the user agrees to receive promotional offers only when the terminal station is at their home;

the cost of the services offered by the server SE; e.g. the user refuses to communicate certain items of personal data PD if the services cost more than a predetermined amount, or conversely the server refuses to offer certain services if the user decides to pay for them in cash;

time data; e.g. the user agrees to receive emails only during office hours;

Universal Resource Locator (URL) pre-stored Web site addresses; the station TS refuses to communicate any personal data to a server if the address of said server is not contained in the list of site addresses; and the destination of the personal data to be communicated; e.g. the user refuses to communicate the personal data when the server SE wishes to communicate it to predetermined individuals or to predetermined bodies corporate, or to countries whose governments have not legislated on data-processing, files, and civil liberties, and in particular on protection of personal data.

In order to take certain items of personal data PD from the memory ME in the terminal station TS, the server SE contains server policy data SP that can be recognized by the browser BR and that is thus also expressed in compliance with the P3P Standard in XML. In general, the policy data SP transmitted by the server SE to the terminal station TS is in the form of a form that includes questions and comments QC analogous to use data PDU and whose answers correspond to personal data PD identified by identifiers PDIs. Thus, a message transmitted by the server SE contains a form defining a server policy SP with data QC and corresponding identifiers PDIs.

Figure 2:
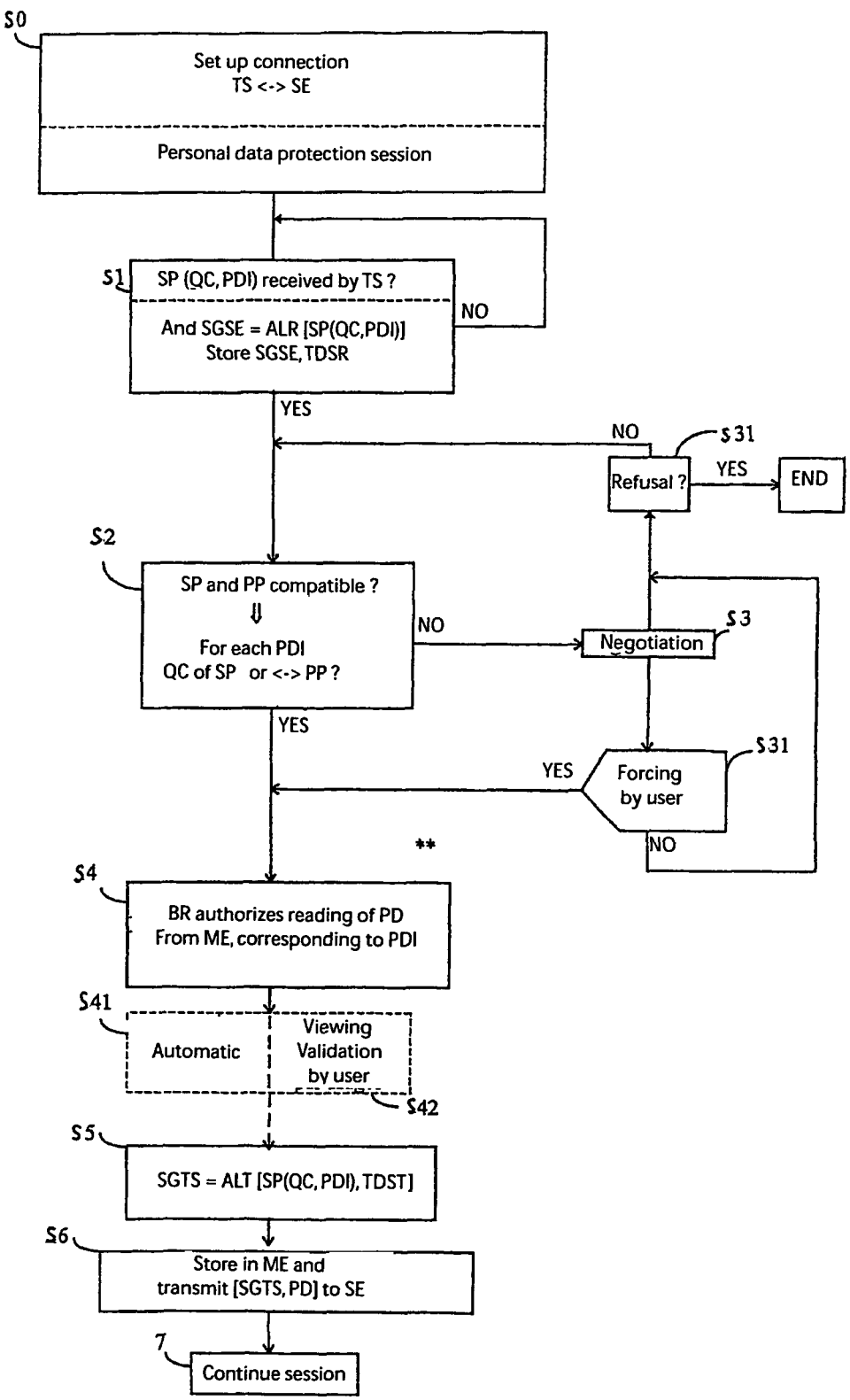
FIG. 2 is a flow chart showing an algorithm of the method of protecting personal data that is implemented in the terminal station.

With reference to FIG. 2, the method of the invention for protecting data mainly comprises steps S1 to S7. These main steps follow in succession from an initial step S0 in which a connection is set up conventionally between the terminal station TS and the server SE after the URL address of the server SE has been selected by the user in order to open a server access session (in which access is given to the server) starting with a personal data protection session. The algorithm of steps S1 to S7 is essentially installed in the central processing unit CPU of the terminal station TS, e.g. in the form of an applet in JAVA language that is downloadable and executed by the browser BR.

In step S1, the station TS receives server policy data SP, in particular comprising personal data identifiers PDIs and server policy SP data QC, e.g. in the form of a P3P form in XML. Then, in step S2, the browser BR compares the received data QC, PDI defining the server policy PS with the data PDU of the private policy PP that is read from the memory ME. Verifying that the server policy is compatible with the private policy substantially involves checking that, for each personal data identifier PDI communicated by the server SE, the received corresponding data QC belong to or are expressed in an equivalent form in the private policy PP defined by the user and stored in the memory ME in the terminal station. If the received server policy data is compatible with the pre-stored private policy data, the browser BR authorizes, in step S4, those items of personal data PD in the memory ME which are addressed by the respective received identifiers PDIs to be read from said memory.

Conversely, if the server policy PS and the private policy PP are incompatible, i.e. if the answer to at least one of the received items of data QC is incompatible with the private policy use data PDU corresponding to a received identifier PDI, the server SE proposes a negotiation in step S3, subsequent to a temporary refusal transmitted by the terminal station.

For example, if the server SE specifies in data QC that it wishes to have the electronic mail address of the terminal station TS for direct marketing purposes and if the user refuses to communicate that information, the server then dialogues with the user in order to find a compromise. If the user is associated in the server with the characteristics of being a "good customer" who has generated turnover greater than a predetermined limit for purchases directly from the site of the server SE, the server SE agrees to continue the session without the terminal station communicating the email address. Conversely, for all new customers, the server refuses to continue the session if the email address of the new customer is not communicated, and the algorithm then goes from step S3 to a step S31 to terminate the session.

In a variant, if a negotiation is envisaged in step S3, the browser BR displays a window on the screen of the terminal station TS in order to ask the user whether they wish to waive the prohibition on personal data communication that generated the negotiation. Thus, in a step S32, the user decides by way of exception to force automatically reading of one or more items of personal data PD that may not normally be communicated to the server for the server policy SP.

After step S2, when compatibility is established, or after step S32, when reading is forced, the browser BR authorizes reading of the personal data DP corresponding to respective ones of the received identifiers PDIs, in step S4. Preferably, the received server policy data items SP are converted into a form that is viewed in the terminal station TS, and that is filled in automatically with the personal data PD that has been read.

Then, in compliance with the invention, the browser BR decides, at step S5, to sign the received server policy data SP (QC, PDI) using a predetermined algorithm ALT, optionally including a predetermined key, in order to produce a server policy data signature SGTS. For example, the algorithm ALT results from hashing the received data, resulting in a hash of size smaller than the size of the received data, which hash is then encrypted by an asymmetric encryption algorithm such as the Rivest Shamir Adleman (RSA) encryption algorithm having public and private keys.

Preferably, transmit time-stamping data TSDT such as current date and time is attached to the received policy server data so that it is signed therewith as a signature SGTS=ALT [SP(QC, PDI) and TSDT].

In a variant, instead of going automatically S41 from reading personal data PD in step S4 to signing in step E5, an intermediate step S42 is provided between steps E4 and E5, which intermediate step, by means of a particular viewing window displaying the data PD that has been read, invites the user to validate the signature of the read data PD and the transmission thereof for the next step S6.

After step S5, the terminal station TS transmits the server policy data signature SGTS and the personal data PD read from the memory ME in step S4. Preferably, the memory ME of the station TS keeps the transmitted data and in particular the signature SGTS and the transmit time-stamping data TSDT with the address of the server. Then the session with the server SE is continued in step S7. The server SE thus receives the signature SGTS that it stores with the date and the time at which said signature is received, in correspondence at least with the address of the terminal station TS in order to justify subsequently, if necessary, that the user has authorized communication of the personal data PD that was read at the instant indicated by the data TSDT at step S4, and that was transmitted at step S6. If the user has kept the signature SGTS and the transmitted data in the memory ME, said transmitted data is compared with the data received by the server, which should put an end to any dispute.

Finally, in order to improve the proof of communication of personal data to be evidenced subsequently, the server policy data SP (QC, PDI) is pre-signed as a signature SGSE by the server SE and kept by said server with current time-stamping data. The signature SGSE is transmitted with the policy data SP by the server SE and is also received by the terminal station TS in step S1. The signature SGSE and time-stamping data items TSDR relating to reception of the signature are written in the memory ME of the station TS. The signature SGSE provides additional means of presuming that the user has received the server policy data SP. Preferably, the algorithm ALR installed in the server for signing the data SP differs from the algorithm ALT.

Figure 3:
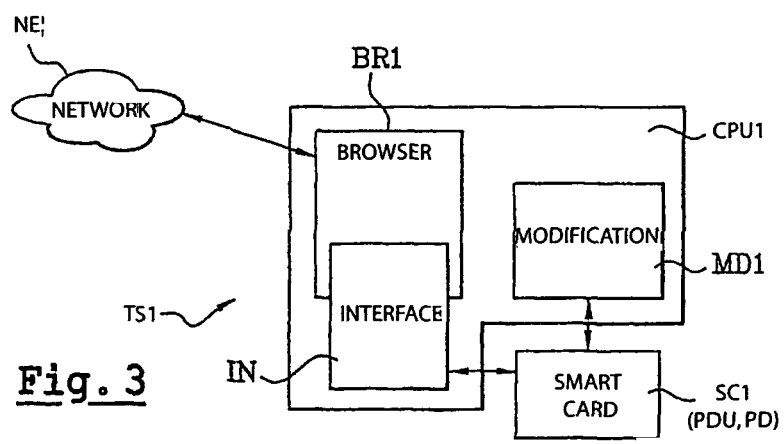
FIGS. 3 and 4 are block diagrams showing operation of respective ones of two variants of a second implementation of the terminal station equipped with a reader for reading an add-on smart card.
Figure 4:
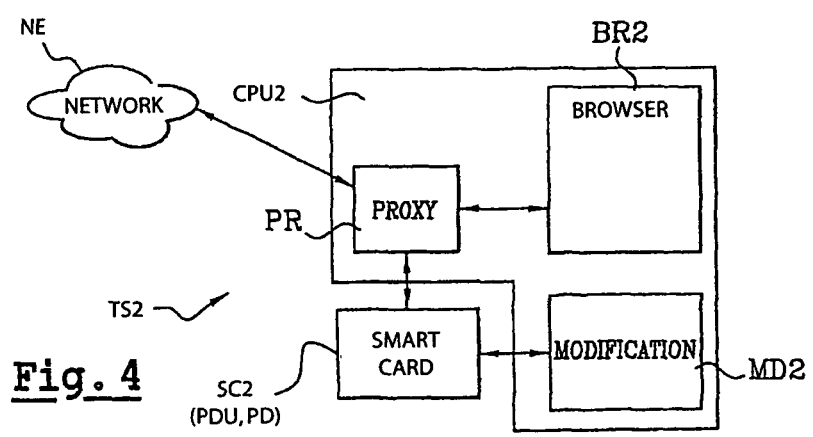

In other implementations shown in FIGS. 3 and 4, the terminal station TS1, TS2 includes a central processing unit CPU1, CPU2 which is provided with a reader for reading an add-on smart card SC1, SC2, also referred to as a "micro-controller card" or as an "integrated-circuit card". The central processing unit CPU1, CPU2 can be, inter alia, a mobile telephone terminal, in which the Subscriber Identity Module (SIM) is distinct from the add-on smart card SC1, SC2. The link between the smart card SC1, SC2 and the central processing unit CPU1, CPU2 is conventional and can be a link via electrical contact, or a "contactless" link, or a local radio link of the Bluetooth type, which does not require any physical contact between the central processing unit and the card.

In the implementation shown in FIG. 3, the smart card SC1 is in communication with the browser BR1 via a software module or "plugin" IN acting as an interface so that the micro-controller in the smart card SC1 has access to the information in the browser BR1.

In the implementation shown in FIG. 4, the browser BR2 cannot have direct access to a dialogue with the server SE through the network NE. The terminal station TS2 then includes an intermediate proxy module PR between the browser BR2, the smart card SC2 and the network NE so that the proxy PR acts as a server relative to the browser BR2 and as a customer relative to the server SE, and can retrieve data, in particular personal data PD, from the smart card SC2.

For each of the two implementations shown in FIGS. 3 and 4, three variants are provided.

Preferably, for all three variants, the smart card SC1, SC2 itself compares the server policy data SP with the private policy data PP pre-stored in the station in step S2.

In a first variant, only the private policy data PP (PDU, PD) is pre-stored in the smart card SC1, SC2, instead of in the memory ME of the central processing unit CPU. The browser BR1, BR2 has the signature algorithm ALT.

In a second variant, the smart card SC1, SC2 stores and manages all of the data relating to the private policy PP. In this variant, the non-volatile memory of the Electrically Erasable Programmable Read Only Memory (EEPROM) type of the smart card has pre-stored the personal data PD, the personal data use data PDU, and the signature algorithm ALT in order to determine, in the card SC1, SC2 itself, the signature SGTS as a function of the server political data SP and of the time-stamping data TSDT.

The private policy and particularly the personal data specific to the user and pre-stored in the smart card SC1, SC2 is thus portable on any platform equipped with a reader for reading an add-on smart card, thereby increasing the security of access to the user's personal data.

During a session, at least the signatures SGTS and SGSE and the corresponding time-stamping data items TSDR and TSDT with the address of the server SE are also recorded in the smart card.

In a third variant, the central processing unit CPU1, CPU2 of the terminal station TS1, TS2 has pre-stored said private policy data PP and the personal data PD, and the smart card SC1, SC2 contains the algorithm ALT for signing the received server policy data SP and preferably time-stamping data.

As also shown in FIGS. 3 and 4, the central processing unit CPU1, CPU2 of the terminal station TS1, TS2 includes a software module MD1, MD2 for enabling data PDU, PDI, PD of the private policy PP to be modified by the user.

In yet another variant, the smart card is connected directly to the browser.

The invention claimed is:

1. A method of protecting personal data read from a user terminal station by a server, comprising the steps of:
storing, in a computer-readable memory at the user terminal station, private policy data including a plurality of personal data items and at least one usage rule associated with each personal data item from the plurality of personal data items;
receiving, at the user terminal, server policy data transmitted from the server, the server policy data including a request for a personal data item stored in said computer-readable memory and indicating a desired use of said requested personal data item;
comparing the server policy data received from said server with said private policy data stored in said computer-readable memory to determine if the desired use of said personal data item requested by said server complies with the at least one usage rule stored in said computer-readable memory associated with said personal data item;
determining whether said desired use of said personal data requested by said server complies with the at least one usage rule associated with said personal data item;
if said desired use of said personal data requested by said server complies with the at least one usage rule associated with said personal data item, determining a signature for signing the server policy data received in the user terminal station; and transmitting, to the server, the signature for the server policy data and the requested personal data item when said desired use of said personal data requested by said server complies with the at least one usage rule associated with said personal data item.

2. A method according to claim 1, wherein the steps of comparing, determining, and transmitting the signature and the requested personal data item are automatically performed in the terminal station without user intervention.

3. A method according to claim 2, wherein the received server policy data is converted into a form that is viewed in the terminal station and that is filled in automatically with the requested personal data item.

4. A method according to claim 1, wherein the terminal station determines the signature also as a function of time-stamping data.

5. A method according to claim 4, wherein the terminal station stores the signature and the time-stamping data.

6. A method according to claim 1, further including the steps of transmitting a signature of the server policy data with the server policy data from the server to the terminal station, and storing said signature in the terminal station, with time-stamping data.

7. A method according to claim 1, further including the step of providing means in the terminal station for modifying private policy data.

8. A method according to claim 1, wherein the terminal station includes a central processing unit, wherein the computer-readable memory includes a smart card that is in communication with the central processing unit.

9. A method according to claim 8, wherein the smart card contains an algorithm for signing the received server policy data and time-stamping data.

10. A method according to claim 6, wherein the terminal station includes a central processing unit and a smart card that is in communication with the central processing unit and that has pre-stored said private policy data and the plurality of personal data items.

11. A method according to claim 1, wherein the terminal station includes:
   a central processing unit in communication with the computer-readable memory; and
   a smart card in communication with the central processing unit, said smart card containing an algorithm for signing the received server policy data and time-stamping data.

12. A method according to claim 8, wherein the smart card itself compares the server policy data with private policy data.

13. A method according to claim 10, wherein the smart card records the signature of the server policy data transmitted by the server, with time-stamping data.

* * * * *